US005738748A

United States Patent [19]

Mitchell, Jr.

[11] Patent Number: 5,738,748

[45] Date of Patent: Apr. 14, 1998

[54] METHOD OF MAKING LAMINATED THERMAL TRANSFER PRINTABLE LABELS

[75] Inventor: Chauncey T. Mitchell, Jr., Lakeland, Tenn.

[73] Assignee: Media Solutions, Inc., Lakeland, Tenn.

[21] Appl. No.: 692,203

[22] Filed: Aug. 5, 1996

Related U.S. Application Data

[62] Division of Ser. No. 242,313, May 13, 1994, Pat. No. 5,587,214.

[51] Int. Cl.$^{6}$ .......................... B32B 31/08; B32B 31/12; B32B 31/26

[52] U.S. Cl. .......................... 156/253; 156/191; 156/192; 156/247; 156/270; 156/277; 156/289; 156/324

[58] Field of Search .................................... 156/184, 191, 156/192, 247, 278, 289, 290, 291, 268, 270, 324, 344, 277, 253; 428/40.1, 41.8, 41.9, 42.1, 42.3, 43, 198, 343, 354

[56] References Cited

U.S. PATENT DOCUMENTS

| | | |
|---|---|---|
| 3,332,829 | 7/1967 | Avery . |
| 4,104,816 | 8/1978 | Pingeton . |
| 4,244,605 | 1/1981 | Deneau . |
| 4,253,899 | 3/1981 | Takemoto et al. . |
| 4,328,977 | 5/1982 | Ozawa et al. . |
| 4,370,370 | 1/1983 | Iwata et al. . |
| 4,388,362 | 6/1983 | Iwata et al. . |
| 4,415,615 | 11/1983 | Esmay et al. . |
| 4,525,566 | 6/1985 | Homan et al. . |
| 4,541,340 | 9/1985 | Peart et al. . |
| 4,577,204 | 3/1986 | Shibata et al. . |
| 4,587,156 | 5/1986 | Wu . |
| 4,587,167 | 5/1986 | Maietti et al. . |
| 4,590,497 | 5/1986 | Shibata et al. . |
| 4,633,276 | 12/1986 | Shibata et al. . |
| 4,708,907 | 11/1987 | Flutti et al. . |
| 4,784,714 | 11/1988 | Shibata . |
| 4,851,383 | 7/1989 | Fickenscher et al. . |
| 4,869,941 | 9/1989 | Ohki . |
| 4,886,774 | 12/1989 | Doi . |
| 4,898,849 | 2/1990 | Kang . |
| 5,037,219 | 8/1991 | Duport . |
| 5,168,002 | 12/1992 | Maietti . |
| 5,198,296 | 3/1993 | Suzuki et al. . |
| 5,226,994 | 7/1993 | Breen . |
| 5,242,650 | 9/1993 | Rackovan et al. . |
| 5,292,713 | 3/1994 | Stenzel et al. . |
| 5,427,840 | 6/1995 | Imamura et al. . |

FOREIGN PATENT DOCUMENTS

| | | |
|---|---|---|
| 0314592 | 5/1989 | European Pat. Off. . |
| 0373954 | 6/1990 | European Pat. Off. . |
| 0419236 | 3/1991 | European Pat. Off. . |
| 0442823 | 8/1991 | European Pat. Off. . |
| 0577241 | 1/1994 | European Pat. Off. . |
| 0600622 | 6/1994 | European Pat. Off. . |
| 0637547 | 2/1995 | European Pat. Off. . |
| 59-107264 | 7/1984 | Japan . |
| 59-179071 | 11/1984 | Japan . |
| 60-54842 | 3/1985 | Japan . |
| 2165988 | 6/1990 | Japan . |

OTHER PUBLICATIONS

"Rising Thermals", Packaging Week Magazine, PW Info No. 124, Nov. 29, 1989, p. 27.

*Primary Examiner*—Curtis Mayes
*Attorney, Agent, or Firm*—Eugene Stephens & Associates

[57] ABSTRACT

A label stock includes a thermal transfer facestock and a thermal transfer ribbon that are laminated together. The face stock has a front face for receiving thermal transfer ink and a back face covered by an adhesive. The ribbon has a front face covered by thermal transfer ink and a back face covered by a release. The facestock and ribbon are laminated and wound together into a roll so that the ribbon also functions as a conventional release liner.

46 Claims, 4 Drawing Sheets

METHOD OF MAKING LAMINATED THERMAL TRANSFER PRINTABLE LABELS

RELATED APPLICATIONS

This application is a Division of allowed parent application Ser. No. 08/242,313, filed 13 May 1994, now U.S. Pat. No. 5,587,214 and entitled LAMINATED THERMAL TRANSFER PRINTABLE LABELS.

TECHNICAL FIELD

The invention relates to the fields of label making and printing. The fields are related by combining elements of thermal transfer printing with label making.

BACKGROUND

Thermal transfer printing is a type of non-impact printing in which controlled concentrations of heat are used to melt ink from a ribbon onto a print medium. The ribbon is a thin film or paper that readily transfers heat from its back face, which engages heating elements of a printing mechanism, to its front face, which is coated with a wax- or resin-bound ink. The print medium has a front face that is made to receive the melted ink.

One use of thermal transfer printing is for printing self-adhesive labels, which can be made with thermal transfer paper or film facestocks. The front face of the facestock must be absorptive to prevent the ink from smearing yet very smooth to prevent discontinuities in the printed image. Coating materials, such as calcium carbonate and calcinated clay pigments, are often used to increase absorptivity.

A back face of the facestock is coated with an adhesive for applying a length of the facestock to another article. A liner having a release coating protects the adhesive and allows the facestock to be wound into a roll of label stock prior to use. The liner also allows the facestock to be divided into individual labels that are carried by the liner.

The thermal transfer ribbon and the lined facestock are fed from different spools into a thermal transfer printer. The front face of the ribbon is registered in contact with the front face of the facestock between a thermal print head and a platen. Under light pressure, heat from the print head causes the ink to melt from the ribbon and be absorbed by the facestock. The ribbon is rewound onto a take-up spool for disposal. Individually printed labels can be dispensed either separately from or together with the liner. In the former case, the liner is rewound onto a take-up spool for disposal. In the latter case, sections of the liner must be discarded individually after the labels are removed.

However, the liners do not readily degrade, and disposal can be expensive. The liners are relatively costly to make and account for up to 60 percent of the size and weight of label stock rolls. The additional weight increases shipping costs, as well as the weight of portable thermal transfer printers. Also, many printer dispensing failures occur because of difficulties separating labels from the liners.

SUMMARY OF INVENTION

My invention provides for replacing conventional release liners of thermal transfer printable label stock with specially adapted thermal transfer ribbons. A release coating is applied to a back face of the thermal transfer ribbon, and the ribbon is laminated together with a self-adhesive facestock in place of the release liner. Thus, in addition to the function of carrying ink, the ribbon also functions as a release liner for protecting an adhesive layer of the facestock.

A single roll of laminated ribbon and facestock replaces separate rolls of ribbon and lined facestock. This reduces inventory items, packaging requirements, and shipping costs and makes planning easier because the required amount of ribbon is laminated together with the facestock.

Printer drive mechanisms can be simplified by eliminating one of two feed spools for conventional ribbons and facestock, as well as by eliminating a take-up spool for conventional liners. Operation of the printers is also simplified because only one feed spool requires loading, and the ribbon and facestock are used up together. Further, dispensing failures can be reduced because the adhesive layer of the facestock is separated from the release layer of the ribbon prior to printing.

In another respect, my invention can be understood to include two substrates. A first of the substrates, which forms the facestock, has a front face that is adapted for receiving thermal transfer ink and a back face that is covered with a layer of adhesive. A second of the substrates, which forms the thermal transfer ribbon, has a front face that is covered with a layer of the thermal transfer ink and a back face that is covered by a layer of release. The facestock and ribbon substrates are laminated and wound together into coils such that the adhesive layer of the facestock contacts the release layer of the ribbon.

The contact between the adhesive and release layers can take place either within each coil or between adjacent coils. For example, one version of my invention laminates the adhesive and release layers together prior to winding. Another version laminates the front face of the facestock against the ink layer of the ribbon so that contact between the release and adhesive layers occurs only upon winding.

Regardless of which way the two substrates are laminated together before winding, the front face of the facestock must be registered in contact with the ink layer of the ribbon during printing. Accordingly, the adhesive and release layers are separated either within each coil or between adjacent coils prior to printing. A binder such as fugitive adhesive or static cling can be used to tack the two substrates together for printing.

The facestock can be cut against the ribbon similar to cutting against conventional liners. Cutting divides the facestock into individual labels that are carried by the ribbon. The individual labels can be gripped by the fugitive adhesive to maintain their proper registration with the ribbon. Preferably, the fugitive adhesive is applied directly on the front face of the ribbon in strips that extend along outer edges of the ribbon. Gaps in the strip allow air to escape between the two substrates. The fugitive adhesive exhibits slightly higher bonding strength between the front faces of the substrates than is exhibited by the adhesive and release layers between the back faces of the substrates. This assures that individual labels will remain registered with the ribbon while being unwound into the printer.

DRAWINGS

DETAILED DESCRIPTION

Figure 1:
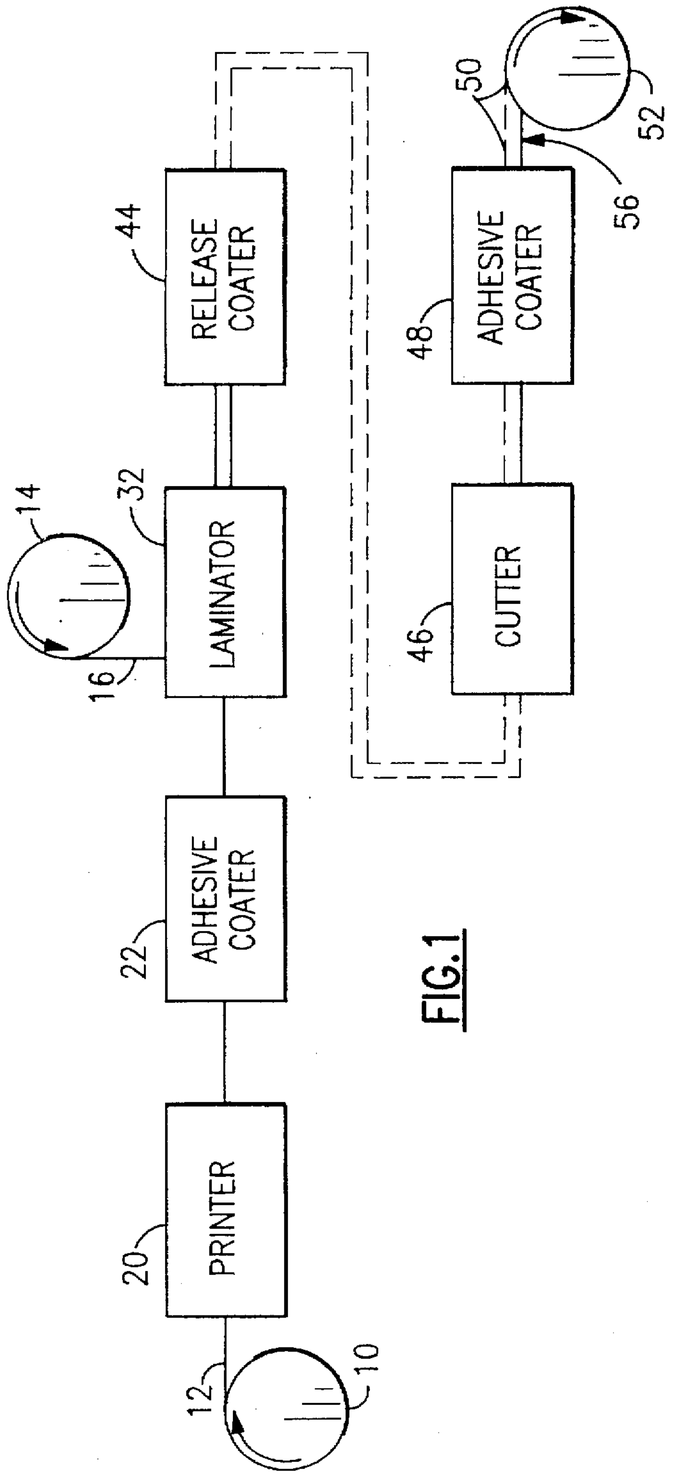
FIG. 1 is a diagram of a system for making a roll of my new thermal transfer printable label stock.
Figure 3:
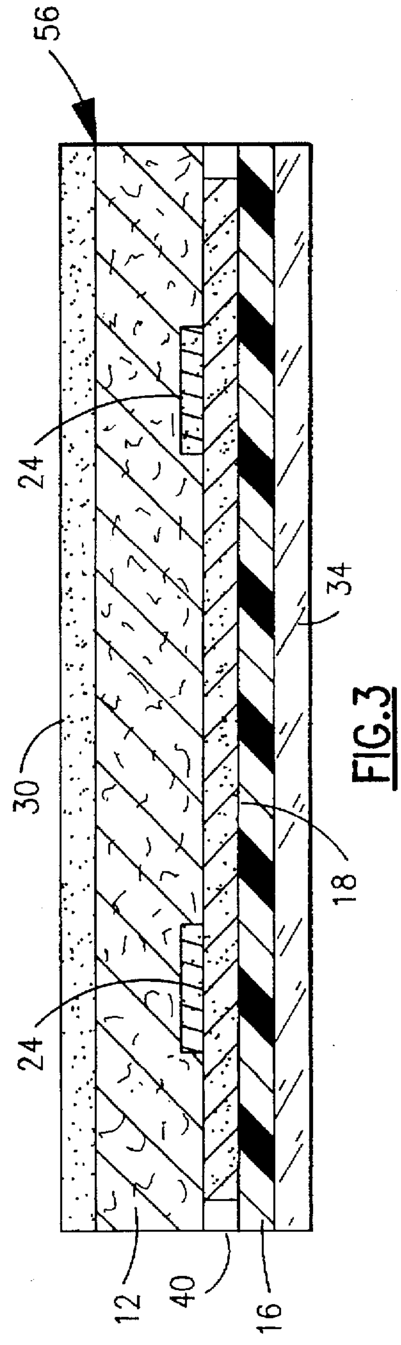
FIG. 3 is a cross-sectional end view taken along line 3—3 of FIG. 2.
Figure 2:
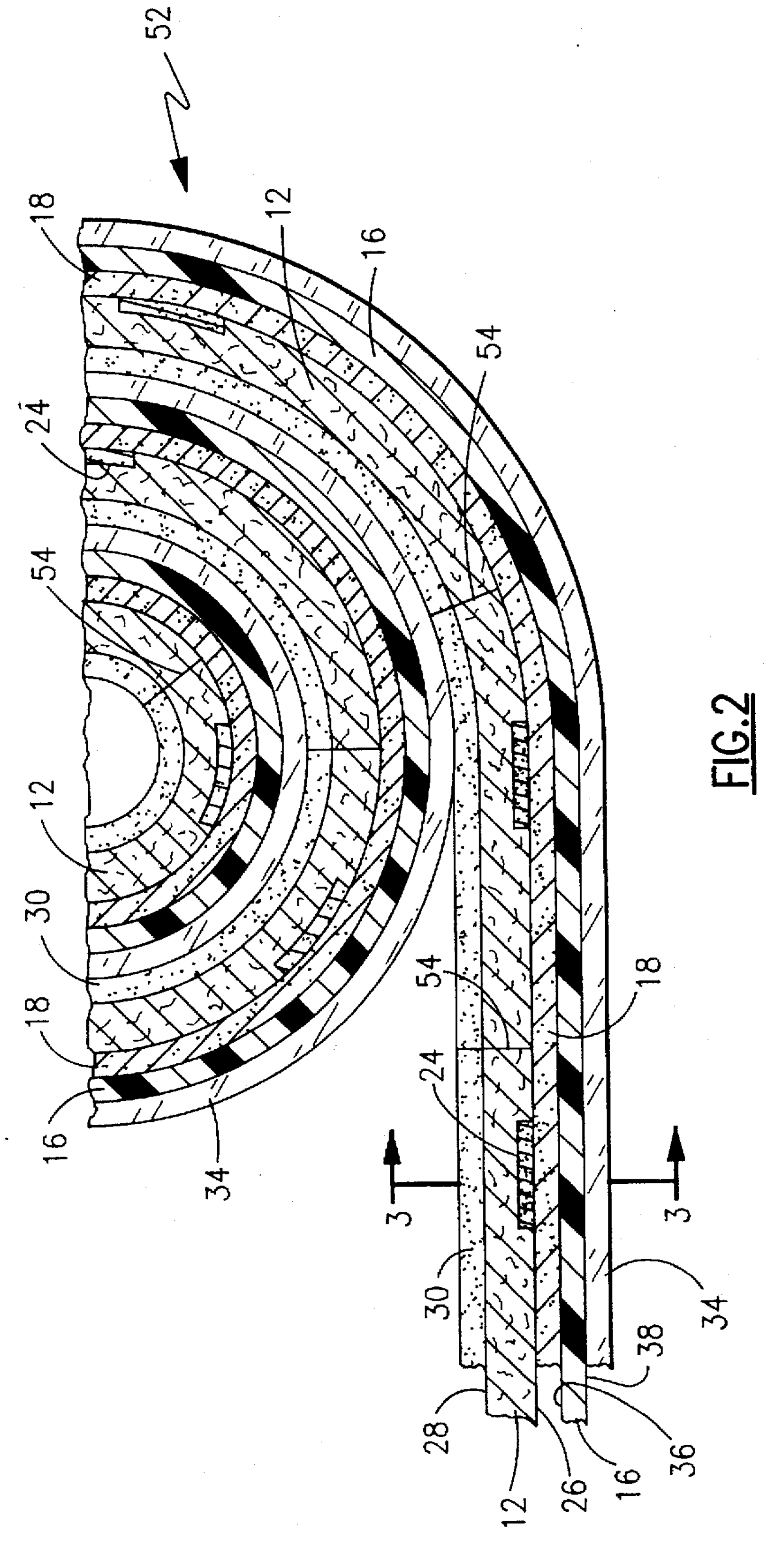
FIG. 2 is a cross-sectional side view through one example of a roll of my label stock in which layers are drawn with exaggerated thickness.
Figure 4:
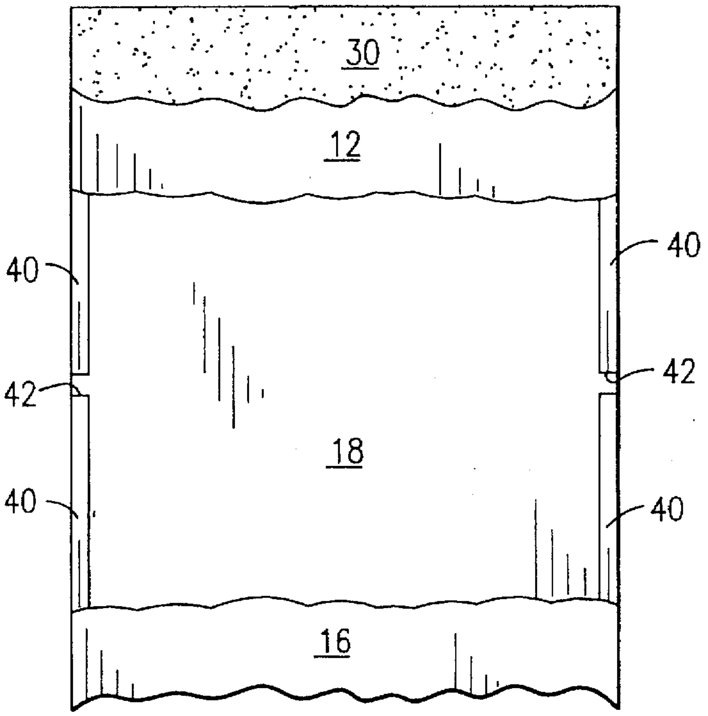
FIG. 4 is a partially cut-away plan view of the same label stock showing a pattern of adhesive between the layers.

My new thermal transfer printable label stock can be made according to the system of FIG. 1 from starting materials such as a roll 10 of thermal transfer facestock 12 and a roll 14 of thermal transfer ribbon 16. A first embodiment of the new label stock is shown in FIGS. 2–4.

The facestock 12, which has front and back faces 26 and 28, is preferably a paper substrate that absorbs thermal transfer inks. The front face 26 of the facestock 12 can be coated to increase absorptivity or to improve appearance. Other facestock substrates can be made from films, metals, ceramics, and glass.

The thermal transfer ribbon 16, which has front and back faces 36 and 38, is preferably made from a polyester film substrate. The front face 36 of the ribbon 16 is coated with a resin- or wax-bound ink 18. Other ribbon or liner materials, including resin or paper materials having higher melting points than the bound ink 18, could also be used.

A printer 20, which can be either a variable or a static information type printer but is preferably a press, operates "in line" on the facestock 12. In fact, either thermal or non-thermal printing could be performed. Ink 24 or other marking material can be applied by the printer 20 in various patterns and colors to the front or back faces 26 or 28 of the facestock 12. For example, logos, forms, or security markings can be applied in predetermined positions on the facestock 12. A water-based flexo ink that is heat and air dried is preferred.

A first adhesive coater 22 and a laminator 32 join the facestock 12 and the ribbon 16. The adhesive coater 22 is arranged to apply a fugitive adhesive 40 in a predetermined pattern to the front face 36 of the ribbon 16. The predetermined pattern includes coatings that cover the entire front face 36. The laminator 32 aligns and presses the facestock 12 and ribbon 16 together.

According to the embodiment of FIGS. 2–4, the front face 26 of the facestock is laminated against the front face 36 of the ribbon. Preferably, the fugitive adhesive 40 is applied in strips to edges of the ribbon 16 for providing a temporary bond between the front faces 26 and 36 of the ribbon and facestock. Gaps 42 allow trapped air to escape between the front faces 26 and 36. The fugitive adhesive 40 can be cured by air or radiation.

A release coater 44, a cutter 46, and a second adhesive coater 48 complete the exemplary in-line operations. The release coater 44 applies a layer of release 34 on the back face 38 of the ribbon. The cutter 46 divides the facestock 12 with cuts 54 into individual labels 50. The adhesive coater 48 applies a layer of adhesive 30 to the back face 28 of the facestock.

The release 34 is preferably a radiation curable, silicone-based material that exhibits little bonding to the adhesive 30 but bonds tightly to the ribbon 16. Other release materials including resins, waxes, and oils can be selected for use with particular adhesives.

The cutter 46 is preferably a die cutting tool for cutting the facestock 12 against the ribbon 16. To enhance the cutting action, the facestock 12 can be a paper that splits apart upon partial penetration of the cutter 46 according to a so-called "butt" cutting technique. On the other hand, the ribbon 16, which functions as a liner for transporting the individual labels 50, preferably resists splitting apart upon partial penetration of the cutter 46. These cutting properties of the facestock 12 and the ribbon 16 widen tolerances for operating the cutter 46.

The adhesive 30 is preferably a pressure-sensitive adhesive that is applied as a hot melt. However, solvent- or water-based adhesives using acrylics, polymers, and rubber bases and which are dried by air or radiation could also be used. Other applications may require the adhesive 30 to be applied in a special pattern or to exhibit other properties such as co-adhesion, repositionability, removability, or resistance to cold.

The completed label stock 56 is wound into a roll 52 in which the layer of adhesive 30 in one coil of the roll contacts the layer of release 34 in another coil. The layer of release 34 also forms the outermost layer of the roll 52. However, the completed label stock 56 Could also be wound with the adhesive layer 30 forming the outermost layer.

The fugitive adhesive 40 is preferably applied just prior to laminating the facestock 12 and ribbon 16, and the adhesive 30 is preferably applied just prior to winding completed label stock 56 into the roll 52. This minimizes exposure of the in-line system to the adhesives 40 and 30, which can contaminate moving parts of the system. Also, the fugitive adhesive 40 is formulated with respect to the adhesive 30 to form a temporary bond between the front faces 26 and 36 of the facestock and ribbon that is stronger than the releasable bond between the back faces 28 and 38 of the facestock and ribbon. This assures that the individual labels 50 remain attached to the ribbon 16 while the label stock 56 is unwound from the roll 52.

The system illustrated in FIG. 1 for making my new thermal transfer label stock admits many variations, including changes to the starting materials and changes to the order and number of the operations. For example, the facestock 12 could be preprinted on the roll 10, and the ribbon 16 could be precoated with the layer of release 34. The fugitive adhesive 40 could be applied in advance to either the front face 26 of the facestock or the front face 36 of the ribbon. The adhesive 30 could also be applied at various times including before or after the facestock 12 and the ribbon 16 are laminated together. The layers of adhesive 30 and release 34 could also be applied in, matching patterns, and the fugitive adhesive 40 could be replaced by static cling.

The cutter 46 could be arranged to partially separate the labels 50 by a series of perforations; and a binder, such as the fugitive adhesive 40, would no longer be needed to transport the labels 50 with the ribbon 16. Cutting could also be performed along with subsequent thermal transfer printing operations on either fixed or variable length labels.

Figure 5:
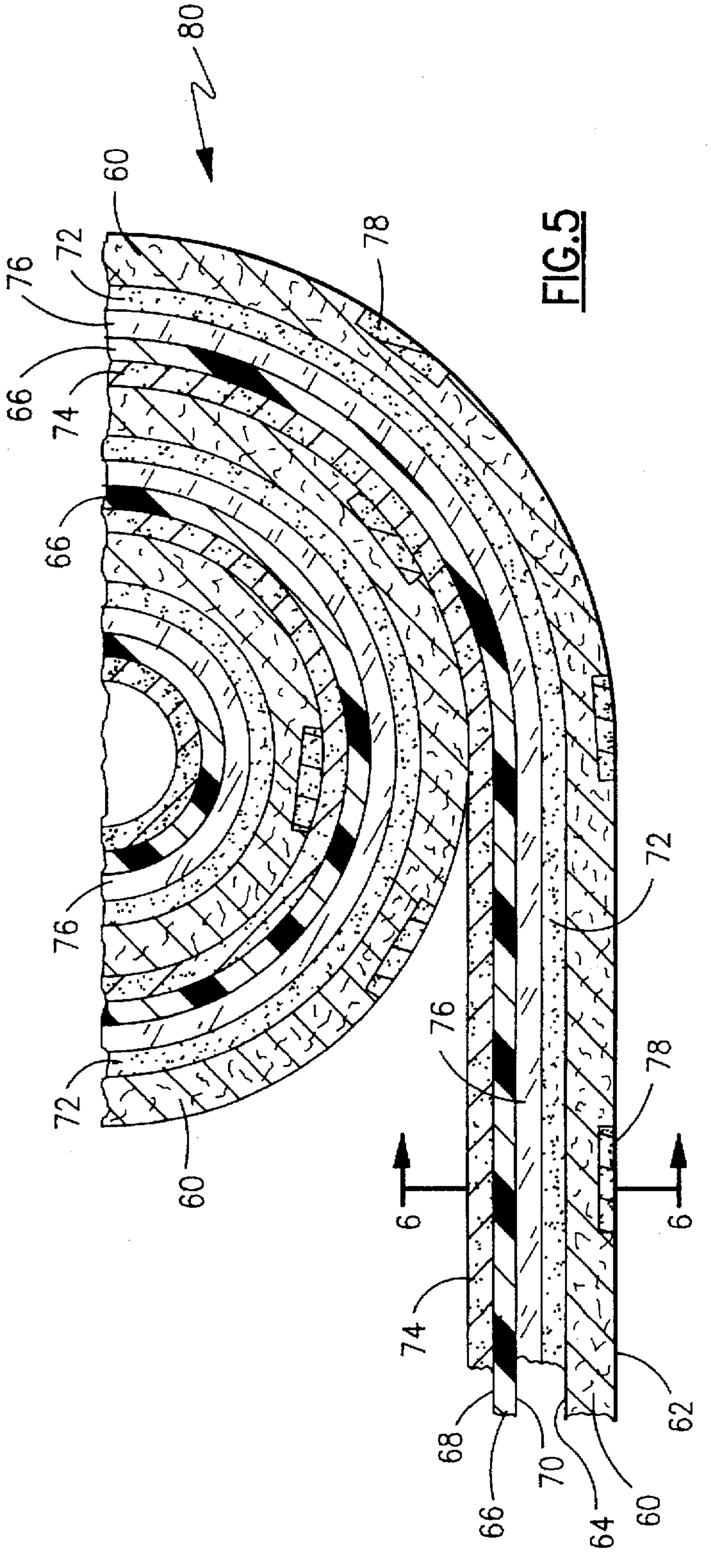
FIG. 5 is a cross-sectional side view of another example of a roll of my label stock, also drawn with layers of exaggerated thickness.
Figure 6:
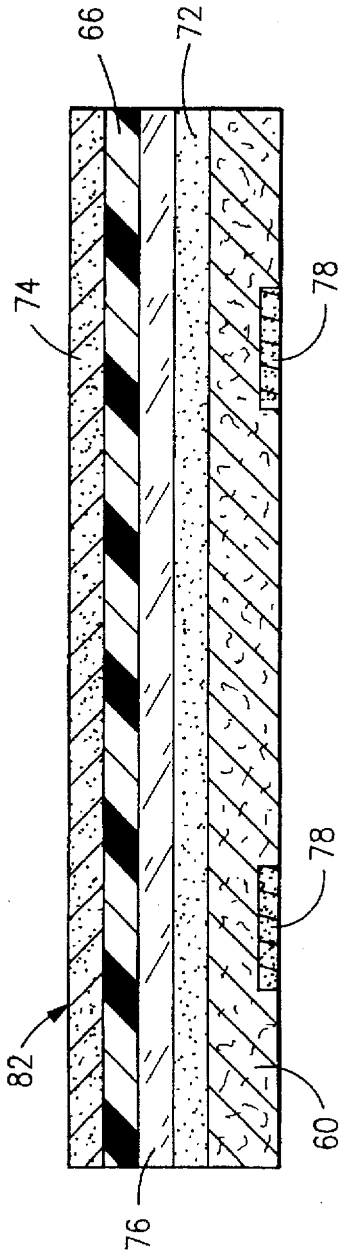
FIG. 6 is a cross-sectional end view taken along line 6—6 of FIG. 5.

Another embodiment of my new label stock, manufacturable by a similar system, is shown in FIGS. 5 and 6. Similar to the preceding embodiment, the present label stock includes a facestock 60 having front and back faces 62 and 64 and a ribbon 66 having front and back faces 68 and 70. The front face 62 of the facestock is adapted for receiving thermal transfer ink, and the back face 64 of the facestock is covered by a layer of adhesive 72. The front face 68 of the ribbon is covered by a layer of thermal transfer ink 74, and the back face 70 of the ribbon is covered by a layer of release 76.

Also similar to the preceding embodiment, the front and back faces 62 and 64 of the facestock can be printed with ink 78 in predetermined patterns or colors. The cutter 46 could also be used to divide the facestock 60 into individual labels separated by perforations. However, in contrast to the preceding embodiment, the adhesive 72 of the facestock back face 64 is laminated to the release 76 of the ribbon back face 70. This simplifies manufacture by providing an immediate cover for the adhesive 72. When wound into a roll 80, the thermal transfer ink 74 on the ribbon front face 68 of one coil contacts the facestock front face 62 of another coil. The front face 62 of the facestock also forms the outermost layer of the roll 80. However, the completed label stock 82 could also be wound with the ink 74 on the ribbon front face 68 forming the outermost layer.

Figure 7:
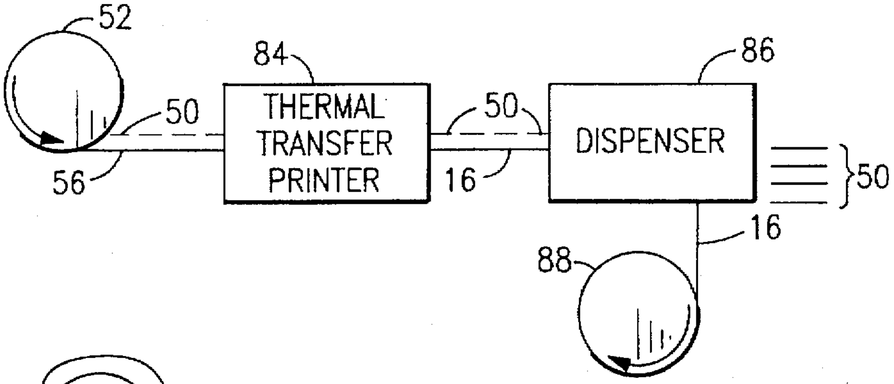
FIG. 7 is a diagram of a printing system for individually printing and dispensing labels from the label stock of FIGS. 2–4.
Figure 8:
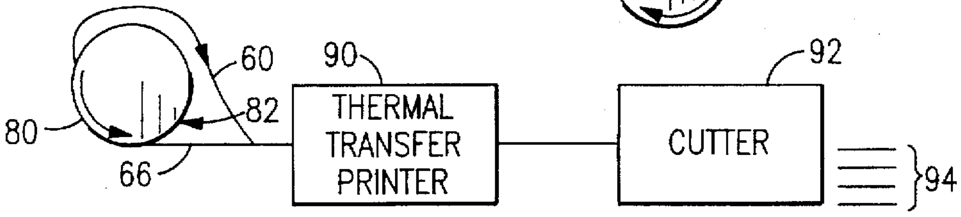
FIG. 8 is a diagram of a printing system for individually printing and dispensing labels from the label stock of FIGS. 5 and 6.

FIGS. 7 and 8 show how the two embodiments can be printed and dispensed. In FIG. 7, the roll 52 of new label stock 56 is unrolled into a thermal transfer printer 84 for printing unique information on the individual labels 50. The binder, e.g., fugitive adhesive 40 (see FIGS. 2–4), is strong enough to overcome any bonding between the layers of adhesive 30 and release 34 to insure that the labels 50 remain attached to the ribbon 16 for transport through the printer 84. However, if static cling is used as a binder, a static remover may be required to limit static discharges that could damage the printer 84.

After printing, a dispenser 86 provides for separating the individual labels 50 from the ribbon 16, which is subsequently rewound into a roll 88 for disposal. Although illustrated as separate processing stages, the functions of dispensing and rewinding are preferably incorporated into the printing device.

In FIG. 8, the facestock 60 of label stock 82 is inverted with respect to the ribbon 66 upon unwinding from the roll 80. This separates the adhesive layer 72 of the facestock from the release layer 76 of the ribbon and positions the front face 62 of the facestock against the thermal transfer ink 74 of the ribbon. In other words, the facestock 60 and the ribbon 66 are relaminated together similar to corresponding layers of the first embodiment. The relaminated label stock is appropriately ordered for printing by thermal transfer printer 90.

After thermal transfer printing on fixed variable lengths of the facestock 60, a cutter 92 divides the facestock 60 into individual labels 94 of corresponding lengths. The ribbon 66 can be cut together with the facestock 60 for dispensing with the labels or can be separately rewound onto a roll similar to the printing system of FIG. 7. Instead of cutting, the facestock 60 could be perforated or aligned with a tear bar for manually separating the facestock 60 into the individual labels 94.

Figure 9:
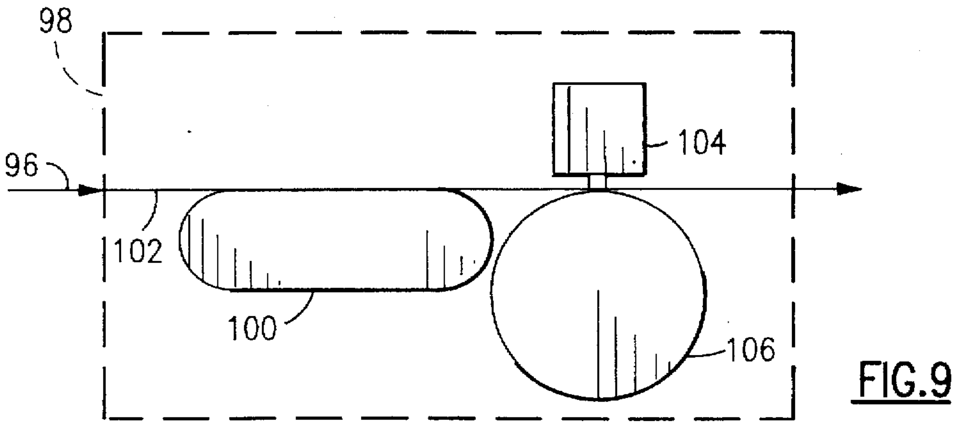
FIG. 9 is a diagram of an internal transport system for a thermal printer.

FIG. 9 illustrates an internal transportation system for my new label stock 96 within a thermal printer 98. The new label stock 96 is guided within the printer 98 by a belt 100 that engages an adhesive layer 102 of the label stock 96 with an endless release surface. The belt 100, which can be coated with a layer of release to prevent the adhesive from sticking, guides the new label stock 96 between a thermal transfer print head 104 and a platen 106. The print head 104 applies a controlled pattern of heat to the back face of the thermal transfer ribbon (see preceding embodiments) for transferring printed images onto the front face of the facestock.

The internal transportation system could also be used to transport other types of self-adhesive facestock through thermal printers, including thermal transfer printers and direct thermal printers. Another such facestock is a self-wound direct thermal printable stock disclosed in my copending application Ser. No. 08/202,838 filed on Feb. 28, 1994, now abandoned. The entire disclosure of this application is hereby incorporated by reference.

I claim:

1. A method of making labels comprising the steps of:

applying a linerless adhesive to a back face of a thermal transfer facestock;

applying a release coating to a back face of a thermal transfer ribbon;

laminating said facestock and said ribbon together; and winding said laminated facestock and ribbon into a roll so that the release coating on the ribbon confronts the linerless adhesive on the back face of the thermal transfer facestock.

2. The method of claim 1 including the further step of dividing the facestock into individual labels.

3. The method of claim 2 in which said step of dividing separates the individual labels by a series of perforations.

4. The method of claim 2 in which said step of dividing includes cutting the facestock against the ribbon.

5. The method of claim 4 in which said step of dividing cuts the facestock into individual labels that are carried by the ribbon.

6. The method of claim 5 in which said step of dividing includes butt cutting the facestock.

7. The method of claim 1 in which said step of laminating includes laminating a front face of the facestock against a front face of the ribbon.

8. The method of claim 7 including the further step of binding the facestock and the ribbon together.

9. The method of claim 8 in which said step of binding includes applying a fugitive adhesive between the front face of the facestock and the front face of the ribbon prior to said step of laminating.

10. The method of claim 9 including the further step of dividing the facestock into individual labels and in which the fugitive adhesive is applied in a pattern that adheres the individual labels to the ribbon.

11. The method of claim 10 in which the fugitive adhesive is applied in strips along edges of the ribbon.

12. The method of claim 1 including the further step of unwinding the roll of laminated web and ribbon into a printer.

13. The method of claim 12 including the further step of applying a controlled pattern of heat to the back face of the thermal transfer ribbon for transferring printed images onto a front face of the facestock.

14. The method of claim 13 including a further step of printing onto one of the front and back faces of the facestock before said step of unwinding the roll.

15. The method of claim 14 in which said further step of printing is performed with a press.

16. The method of claim 1 in which said laminating step includes laminating the back face of the facestock against the back face of the ribbon.

17. The method of claim 16 including the further steps of separating the laminated back faces of the facestock and ribbon and relaminating a front face of the facestock against a front face of the ribbon.

18. The method of claim 17 in which said further steps of separating and relaminating take place after said winding step.

19. The method of claim 18 including the further step of thermal transfer printing onto the front face of the facestock by applying heat to the ribbon following said further steps of separating and relaminating.

20. The method of claim 19 including the further step of dividing the facestock into individual labels.

21. The method of claim 20 in which said step of dividing separates individual labels by a series of perforations.

22. The method of claim 1 including the further step of applying a fugitive adhesive between a front face of the facestock and a front face of the ribbon.

23. The method of claim 22 in which the fugitive adhesive is applied in a pattern.

24. The method of claim 23 in which the fugitive adhesive is applied in strips along edges of the ribbon.

25. The method of claim 24 in which gaps are formed in the strips to release air between the facestock and the ribbon.

26. A method of making a self-adhesive, thermal transfer printed label, the method comprising:

a. applying a linerless adhesive layer to a back face of a length of label stock having a front face receptive to thermal transfer ink;

b. applying a release layer to a back face of a length of thermal transfer ink ribbon having a front face coated with an unimaged layer of thermal transfer ink;

c. winding the label stock and ribbon together in a roll so that the release layer on the back face of the ribbon confronts the adhesive on the back face of the label stock; and d. unwinding the label stock and ribbon so that the front face of the ribbon stock contacts the front face of the label stock in a printer that thermally prints the label with ink imaged from the ribbon.

27. The method of claim 26 including laminating the front face of the ribbon against the front face of the label stock.

28. The method of claim 27 including using a fugitive adhesive disposed between the front faces of the ribbon and label stock.

29. The method of claim 28 including applying the fugitive adhesive in strips to edges of the front face of the ribbon.

30. The method of claim 29 including forming gaps in the strips of fugitive adhesive to release air from between the label stock and ribbon.

31. The method of claim 26 including dividing the label stock into individual labels.

32. The method of claim 31 including tacking the label stock and ribbon together with a binder.

33. The method of claim 32 including using a fugitive adhesive disposed between the front faces of the label stock and the ribbon to serve as the binder for attaching individual labels to the ribbon.

34. The method of claim 33 including forming a stronger bond with the fugitive adhesive between the front faces of the label stock and ribbon than is produced between the adhesive and release layer of the back faces.

35. The method of claim 31 including using for the ribbon a film that resists splitting apart upon partial penetration of a cutting tool.

36. The method of claim 26 including laminating the back face of the label stock against the back face of the ribbon.

37. The method of claim 36 including dividing the label stock into individual labels by a series of perforations.

38. The method of claim 26 including forming the thermal transfer ink of a material that melts from the ribbon upon application of heat to the back face of the ribbon.

39. The method of claim 38 including applying a non-thermal ink to a face of the label stock.

40. The method of claim 26 including forming the label stock into a series of self-adhesive labels.

41. A method of making a self-adhesive label printable by thermal transfer ink, the method comprising:

a. preparing a label stock having a pressure-sensitive adhesive layer on a back face unprotected by any release liner;

b. winding the label stock into a roll with a thermal transfer ink ribbon having a release coating on a rear face that confronts the adhesive layer; and c. unwinding the label stock and ribbon so that the front face of the label stock contacts the front face of the ribbon within a printer where ink from the front face of the ribbon is transferred to image the label stock.

42. The method of claim 41 including laminating the label stock and ribbon together with the ink confronting the front face of the label stock.

43. The method of claim 42 including using a fugitive adhesive for bonding the ribbon and label stock together.

44. The method of claim 41 including laminating the label stock and ribbon together with the adhesive layer confronting the release coating.

45. The method of claim 41 including dividing the label stock into separable labels.

46. The method of claim 41 including forming the label stock into a series of self-adhesive labels.

* * * * *